United States Patent [19]
Rinnert

[11] 3,931,840
[45] Jan. 13, 1976

[54] ACID FILLING APPARATUS FOR STORAGE BATTERIES

[75] Inventor: Helmut Kurt Rinnert, Yorba Linda, Calif.

[73] Assignee: Globe-Union Inc., Milwaukee, Wis.

[22] Filed: Nov. 14, 1974

[21] Appl. No.: 523,692

[52] U.S. Cl. .................... 141/1; 141/126; 141/27; 141/111; 136/175
[51] Int. Cl.² ........................................ B65B 3/04
[58] Field of Search ........... 141/273, 163, 110, 377, 141/1, 171, 164, 172, 378, 369, 274, 118, 124, 271, 272, 126, 111; 136/162, 175

[56] References Cited
UNITED STATES PATENTS
3,786,842  1/1974  Rinnert ................................ 141/1

Primary Examiner—Houston S. Bell, Jr.
Attorney, Agent, or Firm—James L. Kirschnik; John Phillip Ryan

[57] ABSTRACT

An apparatus for filling lead-acid storage batteries with acid by immersion of a plurality of batteries into a tank of acid. A framework is provided over an acid tank for supporting a pivotable linkage carrying a support cradle for a number of batteries. The front and back portions of the linkage are supported by separate pairs of chains attached to a counterweight through a number of sprockets. The front support chains are driven by a motor to raise or lower the front portion of the linkage, and the back pair of chains are delayed during lowering of the linkage so that the linkage pivots to immerse and withdraw the batteries at an inclined angle into and out of the acid tank. The angle of incline of the cradle and batteries determines the level of acid which remains in the batteries after filling. The active lengths of the chain pairs are adjustable for selectively varying the angle of incline of the batteries during immersion.

18 Claims, 5 Drawing Figures

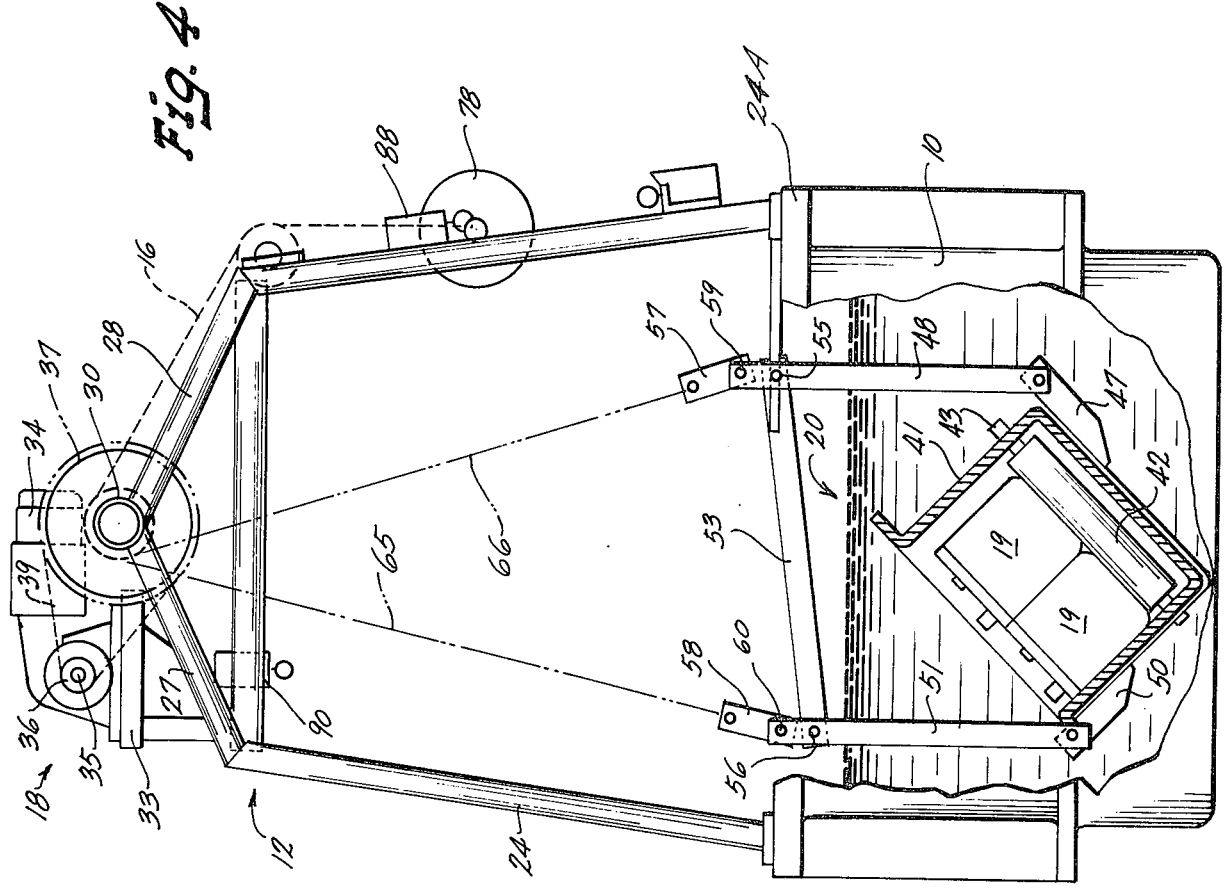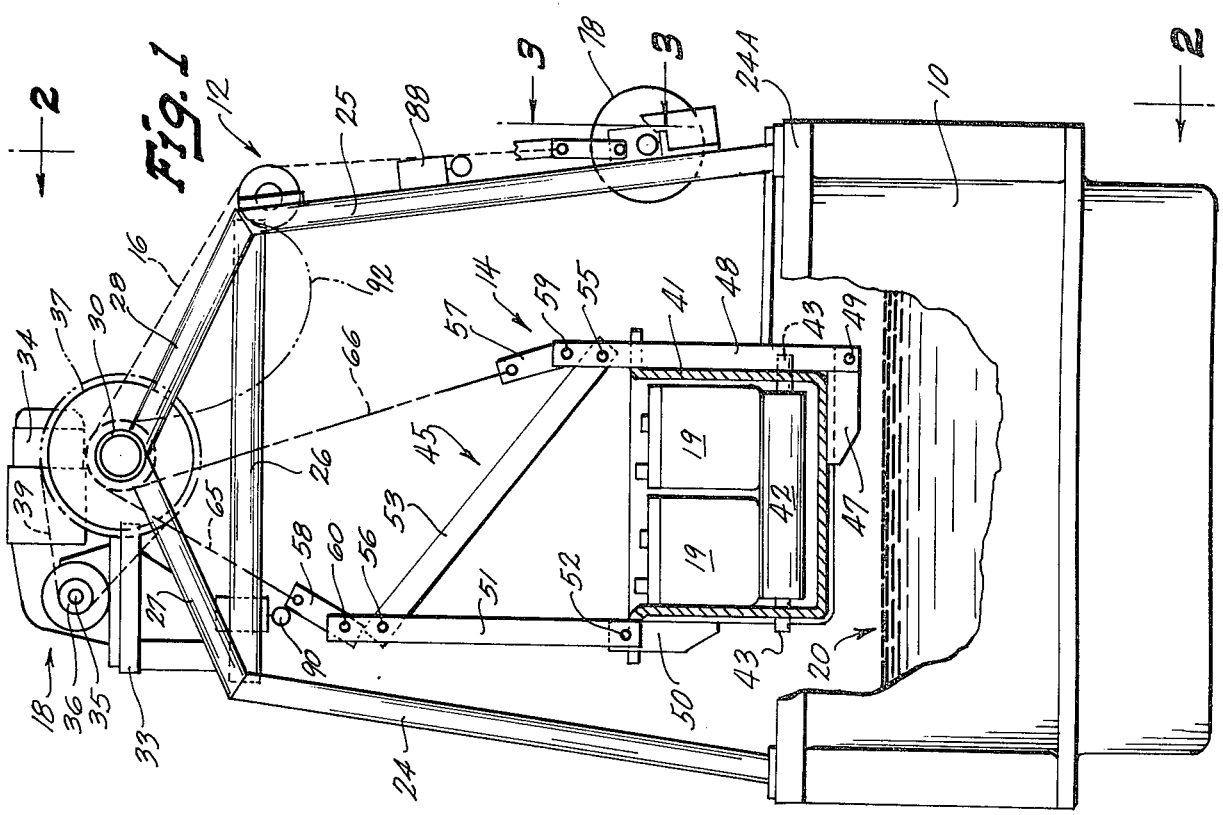

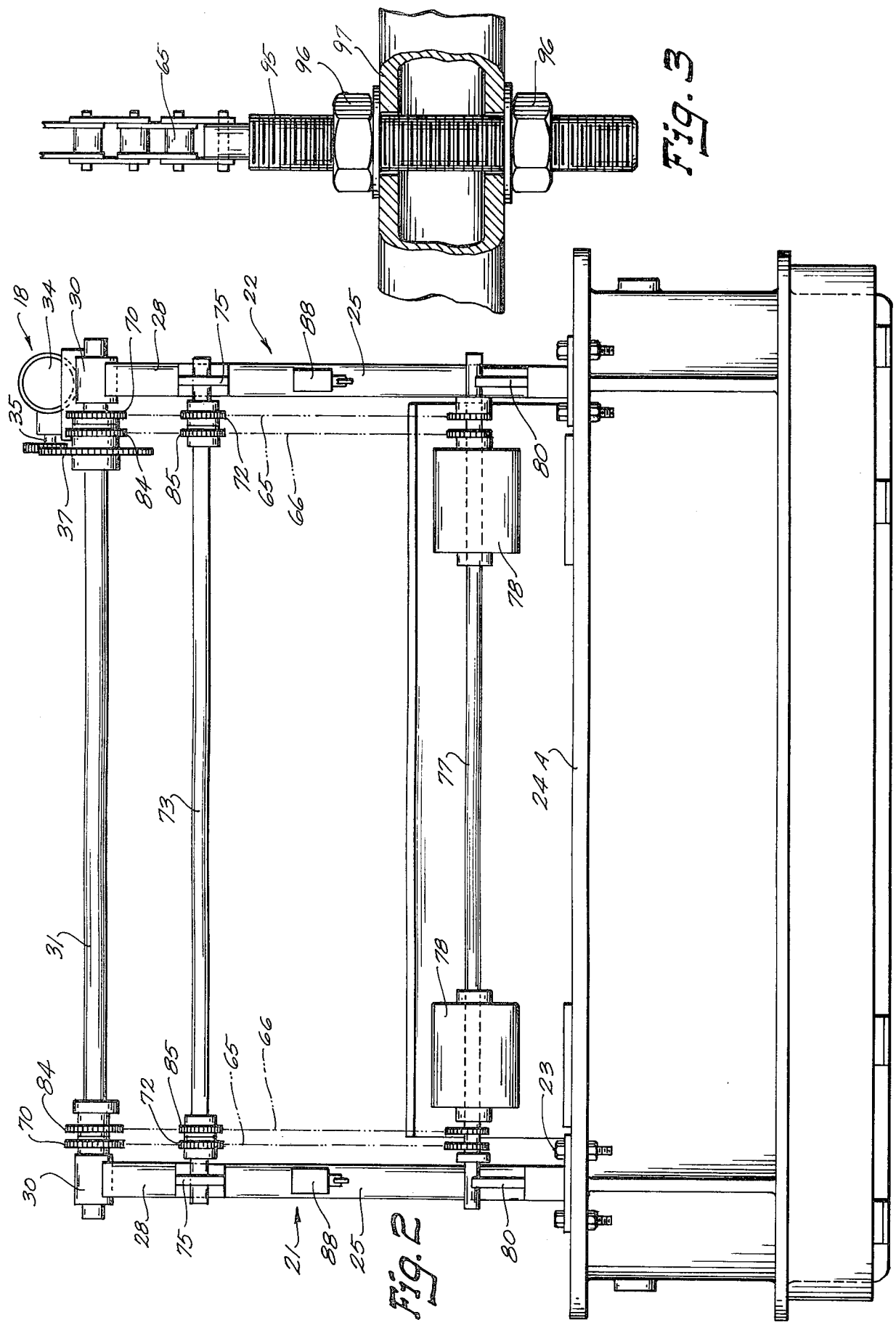

ACID FILLING APPARATUS FOR STORAGE BATTERIES

BACKGROUND OF THE INVENTION

During the manufacture of lead-acid storage batteries, it is often the practice to fill the assembled storage batteries with an acid solution for initially forming the battery plates. In a mass production facility, it is desirable to fill the batteries with acid in as short a time span as possible. After the filling and formation steps, the batteries may either be prepared for shipment with the acid retained, or the batteries may be spun "dry" as described in U.S. Pat. No. 3,738,490 issued June 12, 1973 to Tigerman and assigned to the assignee of the present invention.

One commonly used method of filling storage batteries with acid is the vacuum process. Basically, a vacuum manifold is placed over the battery filling ports and a vacuum created in the individual cell compartments. Acid is then drawn into the battery cells until a desired fill level is attained. A disadvantage of the vacuum fill process is that the cells do not always fill at a uniform rate whereby acid from the earlier filling cells is often drawn out and replaced with fresh acid while the slower filling cells receive acid. Since initial contact of the acid with the battery plates results in some dilution of the acid due to combination of sulfate ions with lead in the plates and release of water, the faster filling cells which receive fresh acid will have a higher specific gravity than the slower filling cells. Another disadvantage of the vacuum process arises in connection with the use of thin-walled battery containers such as described in U.S. Pat. No. 3,388,007 issued June 11, 1968 to Fiandt. In thin-walled batteries, the vacuum in the battery cells causes the end walls to be drawn in slightly thereby decreasing the end cell volume temporarily. Upon removal of the vacuum, the end walls will return to their original position and the cell volume increases whereby the acid level will drop.

SUMMARY OF THE INVENTION

It is an object of the invention to provide an apparatus for filling storage batteries with acid with a minimal amount of filling time.

A further object of the invention is to provide an apparatus for expeditiously filling a plurality of storage batteries with acid to a substantially uniform predetermined level.

Other objects and advantages of the present invention will become apparent from the description of the preferred embodiment which follows.

The invention basically comprises an apparatus for immersing a plurality of storage batteries into a tank of acid, the batteries being immersed and withdrawn from the tank at an inclined angle selected to provide a predetermined level of acid within the batteries. Separate chains are provided for supporting opposite sides of a collapsible linkage which supports the batteries. The chains are driveable to provide for differentially lowering the front and back of the support linkage which is pivotable to permit inclination of the batteries prior to immersion. The chains are then simultaneously driven to immerse and withdraw the batteries from the acid at a constant angle of incline whereby a sufficient quantity of acid will enter the batteries to fill them to a substantially equal level of acid determined by the angle of inclination.

DESCRIPTION OF THE DRAWINGS

FIG. 1 is a side elevational view of the apparatus according to the invention with portions broken away.
FIG. 2 is a view taken along line 2—2 of FIG. 1.
FIG. 3 is a view taken along line 3—3 of FIG. 1.
FIG. 4 is a view similar to FIG. 1 showing the apparatus with the batteries immersed for filling.

DESCRIPTION OF THE PREFERRED EMBODIMENT

Figure 5:
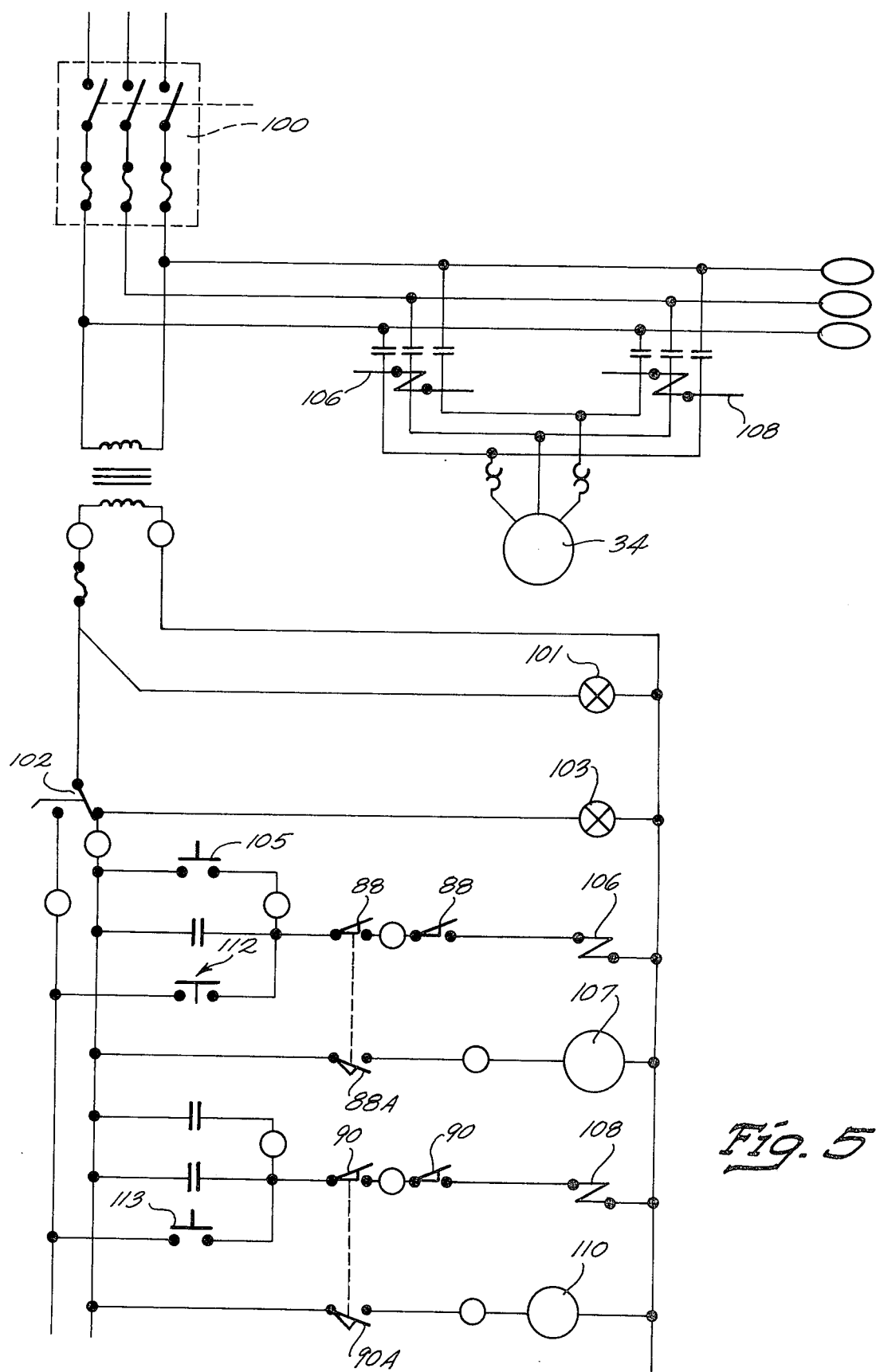
FIG. 5 is an electrical schematic of the circuitry for the apparatus.

Referring to FIGS. 1 and 2, the apparatus is seen to comprise an acid tank 10, a framework 12 for supporting a suspended cradle assembly 14 above the acid tank 10. A flexible chain assembly 16 is provided for raising and lowering the cradle assembly 14 into and out of tank 10 under the influence of a drive assembly 18. A plurality of storage batteries 19 may be placed on the cradle assembly 14 with their filling ports open and facing upwardly for immersion into the tank 10.

As seen in FIGS. 1 and 2, the frame 12 is attached to the top of the acid tank 10. The tank 10 which contains sulfuric acid 20, has an open top and may be constructed of any acid resistant material such as fiberglass. Similarly, framework 12 may also be constructed of an acid resistant material such as stainless steel. The framework 12 generally comprises a pair of spaced upstanding end sections 21 and 22 attached to the top of tank 10 at its opposite ends by any conventional means such as bolts 23. A generally horizontally extending flange 24A may be formed around the top of tank 10 for supporting the frame members 21 and 22. Each frame member 21 and 22 generally comprises a pair of upwardly extending support legs 24 and 25 having one end attached to the top of the tank 10 and their upper ends joined by a generally horizontally extending cross-piece 26. A pair of converging inclined frame members 27 and 28 are attached to the tops of the support legs 24 and 25 and have generally horizontally extending bearings 30 at their apex. The bearings 30 are generally axially aligned with each other and rotatably journal a horizontally extending shaft 31 which extends over the open portion of the tank 10. Frame member 22 may have a platform 33 affixed to its upper portion for supporting a reversible drive motor 34. Motor 34 has its drive shaft 35 extending generally parallel to shaft 31. The drive shaft of motor 34 may have a sprocket 36 attached thereto and a drive sprocket 37 is affixed to shaft 31 in any suitable manner such as with a key or shear pin (not shown). A drive chain 39 may be provided between the sprocket 37 and sprocket 36 of the motor 34 whereby the shaft 31 may be driven. The motor 34 may be of any conventional construction and could be electrically or hydraulically powered as long as it is reversible. In the preferred embodiment the motor 34 is an electric motor.

The cradle assembly 14 is best seen in FIGS. 1 and 2 to include a generally horizontally extending open topped receptacle 41 which extends substantially the length of tank 10 between the upstanding frame members 21 and 22. The receptacle 41 may include a plurality of horizontally extending rollers 42 which extend generally transversly to the longitudinal axis of the receptacle 41. The rollers 42 may be freely supported on shafts 43 journaled in the sides of receptacle 41. The receptacle 41 may have open end portions so that the batteries 19 may be freely rolled into and out of position within receptacle 41 from any suitable conveyor means or other apparatus (not shown). Each end of the receptacle 41 may be supported by a plurality of pivoting linkage assemblies 45. The linkage assemblies 45 are designed to be freely pivotable relative to each other so that receptacle 41 may be tilted. The linkage assemblies 45 are identical at each end of the receptacle 41 so that only one need be described. A first bracket 47 may be attached to the bottom of receptacle 41 and extend outwardly from the back of the receptacle 41. A generally vertically extending link 48 may be pivotally attached at its lower end to the bracket 47 by a pivot pin 49. A similar bracket 50 extends upwardly along the front wall of receptacle 41 and protrudes above the top of the receptacle 41. A generally vertical link member 51 has its bottom end pivotally attached to bracket 50 by means of a pivot pin 52. A third link 53 is pivotally coupled to the upper ends of links 48 and 51 by pivot pins 55 and 56 respectively. Additionally, the extreme ends of members of 48 and 51 have short links 57 and 58 attached by pivot pins 59 and 60 respectively. It will thus be seen that if one of the short links 57 and 58 is raised or lowered with respect to the other links, link members 48, 51 and 53 will pivot relative to each other to permit the receptacle 41 to be inclined relative to horizontal as seen in FIG. 4.

The flexible chain assembly 16 as seen in FIGS. 1 and 2 is provided for suspending the cradle assembly 41 and for raising and lowering the cradle assembly into the acid tank 10. Chain assembly 16 includes a first pair of chains 65 coupled to links 58 at the front of cradle 41 and a second pair of chains 66 coupled to the links 57 at the rear of the cradle assembly 41. The first chain pair 65 is directed upwardly over a pair of sprockets 70 affixed to shaft 31 and passes over a pair of sprockets 72 rotatably journaled on an idler shaft 73. The idler shaft 73 extends generally parallel to shaft 31 and is affixed to brackets 75 attached to the upper portion of frame members 25. Chains 65 pass downwardly from the idler sprockets 72 and are attached to a counterweight shaft 77. The counterweight shaft 77 has a pair of counterweights 78 affixed thereto for counterbalancing the weight of the cradle assembly 14 and batteries 19. The ends of shaft 77 slidingly engage the backs of members 25. A pair of support brackets 80 are provided at the lower portions of members 25 for supporting the counterweight shaft 77 in a lowermost position. The second chain pair 66, coupled to link member 58 on one end, similarly pass over a sprocket pair 84 which are rotatably journaled on shaft 31. Chain pair 66 then pass downwardly over a pair of idler sprockets 85 journaled on idler shaft 73. The ends of each chain of the chain pair 66 are also attached to counterweight shaft 77 at their other ends. A pair of limit switches 88 are mounted on the mid portions of leg members 25 and are adapted to be actuated by shaft 77 as it is raised to their level. A second pair of limit switches 90 are attached to cross members 26 of the framework 21 and 22 and are adapted to be actuated by link 58 in the cradle assembly 16 when it is in its upper-most position. As seen in FIG. 1, the chain pair 65 is provided with a slack portion 92 which extends downwardly between sprockets 70 and sprocket 72 on idler shaft 73. The purpose of the slack 92 in chain pair 65 will be explained hereinafter. As seen in FIG. 3, the ends of chains 65, 66 are all coupled to threaded rods 95 which extend through counterweight shaft 77. Nuts 96 are provided on the rods 95 on each side of the counterweight shaft 77 to provide for varying the extent of protrusion of the rods 95 relative to the counterweight shaft 77. The position of the threaded rods 95 is adjusted by turning the nuts 96 whereby the effective lengths of chain pairs 65 and 66 may be varied to change the angle of incline of the cradle assembly 14.

Having thus described the physical arrangement of parts and components of the battery filling apparatus, the operation of the device will be described with reference to FIGS. 1 through 4. With the cradle assembly 14 in its upper-most position shown in FIG. 1, the receptacle 41 will be level and a plurality of batteries may be rolled into place and supported on rollers 42. In this position, links 58 will be contacting limit switches 90 signaling the controlling circuitry, to be described hereinafter, that the cradle is in its upper-most position. After the batteries 20 are positioned in the cradle assembly 14, motor 34 may be actuated to drive the shaft 31 counterclockwise as viewed in FIGS. 1 and 2. As shaft 31 turns, sprockets 70 which are affixed to shaft 31 drive the chain pair 65 so as to start lowering the front portion of the cradle assembly 14 as the slack 92 in chain pair 65 is taken up. The chain pair 66 prevents motion of the back portion of the cradle assembly 14 by virtue of the connection to the counterweight shaft 77. The sprockets 84 and 85, which are free to rotate on shafts 31 and 73, will remain angularly stationary. As the slack in the chain pair 65 is taken up, the cradle assembly 14 tilts through the link members 48, 51 and 53, to an inclined position as shown in FIG. 4, at which point the continued motion of chain pair 65 begins to raise counterweight shaft 77. The raising of counterweight shaft 77 results in the simultaneous lowering of the back portion of the linkage assembly 45 and the entire cradle assembly 14 is lowered into the acid tank 10 with the batteries 19 at an inclined angle as seen in FIG. 4. The motor 34 continues to lower the cradle assemby 14 until counterweight shaft 77 is raised sufficiently to contact limit switches 88 which then deactivates motor 34. After sufficient time has elapsed to permit acid to enter the batteries 19, motor 34 is reversed to drive shaft 31 in a clockwise direction. It should be noted that the immersion time will affect the final specific gravity of the acid in the batteries. By allowing the batteries to remain submerged for longer periods, a higher final specific gravity will result. The immersion time necessary to obtain a desired final specific gravity is dependent upon the ratio of acid volume to plate volume in the cells and may vary from about 18 seconds up to 120 seconds or more. Driving shaft 31 clockwise results in lowering of the counterweight shaft 77 under the influence of gravity which in turn draws chain pairs 66 and 65 upwardly to raise cradle assembly 14 which is returned to its upward position. As the counterweight shaft is lowered to contact support brackets 80, further rotation of shaft 31 results in raising only the front portion of the cradle assembly 14 by creating slack 92 in the chain pair 65. The raising of the front portion of cradle assembly 14 continues until link members 58 contact limit switches 90 which disengage motor 34.

From the forgoing, it will thus be appreciated that the apparatus provides for maintaining the cradle assembly 14 in a substantially level position for loading batteries 19. The initial motion of the chains will tilt the batteries to a predetermined inclined position after which the entire cradle assembly 14 will be lowered into the acid tank 10 for filling of the batteries 19. The batteries on cradle assembly 14 will be raised out of the tank while maintaining the same angle of incline thereby allowing any excess acid to drain out of the batteries 19. Naturally, the angle of incline of the batteries upon entry into and withdrawal from the acid tank 10 determines the level of acid within the batteries when they are in a level position. The angle of incline may be changed by adjusting the lengths of chains 65 and 66 through the threaded rods 95 connecting the chains to the counterweight shaft 77. While the apparatus is of a simple construction, it permits the aforesaid operations to be speedily carried out through the use of a single drive motor 34.

FIG. 5 is an electrical schematic of the control system for the apparatus of the preferred embodiment. A main power switch 100 is provided for controlling power to the system. An indicator light 101 will indicate when power is on. A selector switch 102 is provided for selecting either a manual or automatic mode of operation. The switch 102 is shown in the automatic mode and indicator light 103 will be illuminated to indicate the automatic mode selection. Limit switches 88 are normally closed with the cradle in its up position whereby switch 105 may be engaged to start the motor 34 through the motor start relay 106. The motor will thus turn counterclockwise lowering the cradle assembly 14 until counterweight shaft 77 opens limit switches 88 stopping the motor 34. When one or both of the limit switches 88 are opened, a second pole 88A will be energized thereby starting a selectively variable timer 107. At this point, all motion is haulted for a predetermined fill time. After timing, the timer 107 will energize motor starter 108 to drive the motor 34 in a clockwise position. The cradle assembly 14 will thus be raised until limit switches 90 are opened by the action of link 58 upon them. Opening of switches 90 in turn closes pole 90A which may be provided to illuminate a signal light 110 to indicate the completion of the cycle. The opening of the limit switches 90 will also stop the motor 34. As seen in the FIG. 5 if the switch 102 is placed in the manual mode, switches 112 and 113 may be actuated manually to control the upward or downward motion of cradle assembly 14.

While one embodiment of the invention has thus been described, it will be appreciated by those skilled in the art that other variations may be possible. For example, a hydraulic drive motor could be substituted for electric motor 34. Additionally, conventional means, not shown, may be provided for maintaining the level of acid 20 within the tank 10 such as through the use of a demand type float valve. Accordingly, while a preferred embodiment has been described, the invention is not to be limited thereby but is to be taken solely by an interpretation of the claims which follow.

I claim:

1. Apparatus for filling a plurality of storage batteries with acid, comprising:
an open topped tank for containing battery acid;
frame means mounted over said tank for supporting a receptacle for receiving a plurality of storage batteries;
immersion means for sequentially inclining said receptacle to a preselected angle of incline to determine the level of acid which remains in the batteries after filling while lowering said receptacle into said tank and raising said receptacle out of said tank after a predetermined filling time, and returning the receptacle to a substantially level position.

2. Apparatus as recited in claim 1 including:
pivotable linkage means coupled to said receptacle for articulatingly supporting said receptacle; and
wherein said immersion means includes extensible chain means coupled at one end to said pivotable linkage means, a portion of said chain means extending between said frame means and said pivotable linkage means for raising and lowering said receptacle.

3. Apparatus as recited in claim 2 wherein:
said pivotable linkage means comprises first link means pivotally coupled to one side of said receptacle, and second link means pivotally coupled to the other side of said receptacle;
said extensible chain means comprises first chain means coupled at one end to said first link means and second chain means coupled at one end to said second link means, said first and second chain means being extensible between a first position supporting said receptacle in a level condition above said tank and a second position supporting said receptacle in an inclined condition within said tank, said first chain means being extensible independently of said second chain means over a portion of the travel of said chains between said first and second positions whereby said receptacle may be inclined.

4. Apparatus as recited in claim 3 including:
first shaft means rotatably journaled in said frame means and extending generally horizontally over said tank;
second shaft means having weights affixed thereto, said second shaft means being vertically movable between an upper and a lower position;
third shaft means mounted on said frame means intermediate said first and second shaft means; and
said first and second chain means extending over said first and third shaft means and having their other ends attached to said second shaft means.

5. Apparatus as recited in claim 4 including:
first sprocket means affixed to said first shaft means for drivably engaging said first chain means, said first chain means having a slack portion between said first and third shaft means when said first chain means is in said first position;
second sprocket means rotatably journaled on said first shaft means and engaging said second chain means whereby the weight of said receptacle applies a tensile force to said second chain between said first receptacle and said second shaft means; and a reversible prime mover for driving said first shaft in a first direction to advance said first chain means and a second direction to retract said first chain means relative to said tank, whereby when said first chain is advanced sufficiently to take up said slack portion, said second shaft will be raised thereby simultaneously advancing said first and second chain means relative to said tank to lower said receptacle.

6. Apparatus as recited in claim 5 including:
first means for detecting when said receptacle is in its upper-most position over said tank; and
second means for detecting when said receptacle is lowered into said tank.

7. Apparatus as recited in claim 6 including:

support means for receiving said third shaft in said lower position; and means for adjusting the working lengths of said first and second chain means between said pivotable linkage means and said second shaft means for varying the inclination of said receptacle.

8. Apparatus as recited in claim 7 including:
at least two idler sprockets independently rotatably mounted on said third shaft means and separately engaging said first and second chain means.

9. Apparatus as recited in claim 8 wherein:
said first chain means comprises a first pair of parallel chains; and
said second chain means comprises a second pair of parallel chains.

10. Apparatus as recited in claim 9 wherein:
said receptacle having an open top and at least one open end, said end being on a side perpendicular to said first shaft means; and
roller means coupled to said receptacle for rollably supporting said batteries.

11. Apparatus as recited in claim 4 including:
support means for receiving said third shaft in said lower position; and
means for adjusting the working lengths of said first and second chain means between said pivotable linkage means and said second shaft means for varying the inclination of said receptacle.

12. Apparatus as recited in claim 3 wherein:
said first chain means comprises a first pair of parallel chains; and
said second chain means comprises a second pair of parallel chains.

13. Apparatus as recited in claim 2 including:
first shaft means rotatably journaled in said frame means and extending generally horizontally over said tank;
second shaft means having weights affixed thereto, said second shaft means being vertically movable between an upper and a lower position;
third shaft means mounted on said frame means intermediate said first and second shaft means; and
said extensible chain means extending over said first and third shaft means and having their other ends attached to said second shaft means.

14. Apparatus as recited in claim 1 including:
first means for detecting when said receptacle is in its upper-most position over said tank; and
second means for detecting when said receptacle is lowered into said tank.

15. Apparatus as recited in claim 1 wherein:
said receptacle having an open top and at least one open end, said end being on a side perpendicular to said first shaft means; and
roller means coupled to said receptacle for rollably supporting said batteries.

16. Apparatus as recited in claim 1 wherein said immersion means includes:
control means for controlling the sequence of operation of said immersion means; and
timer means for selectively varying the amount of time said receptacle is maintained in said tank after lowering.

17. A method of simultaneously filling a plurality of storage batteries having filling ports with acid, comprising:
positioning said batteries over an open topped tank of acid with said filling ports facing upwardly;
inclining said batteries at a predetermined angle of inclination to determine the level of acid which remains in the batteries after filling;
immersing batteries into said tank for a preselected amount of time to fill said batteries with acid;
raising said batteries out of said tank while maintaining said batteries in an inclined position.

18. The method as recited in claim 17 including:
varying the amount of time said batteries are immersed to vary the specific gravity of acid in said batteries.

* * * * *